Nov. 24, 1953

F. KESSLER 2,660,619

LEVEL-HUNTING SELECTOR

Filed Oct. 1, 1949

2 Sheets-Sheet 1

INVENTOR.
FRANK KESSLER
BY
Chas. W. Cardy
ATTORNEY.

Nov. 24, 1953

F. KESSLER

LEVEL-HUNTING SELECTOR 2,660,619

Filed Oct. 1, 1949

2 Sheets-Sheet 2

INVENTOR.
FRANK KESSLER

BY [signature]

ATTORNEY

Patented Nov. 24, 1953

2,660,619

UNITED STATES PATENT OFFICE 2,660,619

LEVEL-HUNTING SELECTOR

Frank Kessler, Rochester, N. Y., assignor to Automatic Electric Laboratories, Inc., Chicago, Ill., a corporation of Delaware Application October 1, 1949, Serial No. 119,158

10 Claims. (Cl. 179—18)

This invention relates in general to switches for automatic telephone systems and more particularly to selector switches therefor.

More specifically, an object of the invention is to provide a two motion selector switch of the Strowger type having both directive and automatic group selecting movement and having automatic trunk hunting movement, wherein the switch first hunts out a level not busy, then rotates within such level in search of an idle connection therein, and should said level become busy during the searching within a given level, the switch then steps to the next succeeding level whereupon it searches therein to find an idle connection, repetition of this sequence being limited only by the number of levels on the switch.

The provision of a switch having the foregoing characteristics makes it possible for a subscriber to have a second, third, or more chance to obtain a trunk connection without having to reoperate his calling device. Frequently a switch will enter a level upon which test has indicated the presence of an idle line only to find that such line or lines have become busied by other calls reached by another selector before the searching wipers of said switch have reached the idle contact. The subscriber then receives busy tone and the switch is held up busy until the calling subscriber hangs up releasing said switch. To obtain a connection, the subscriber would then have to reoperate his calling device which with ill-luck might occur a number of times.

Figure 1:
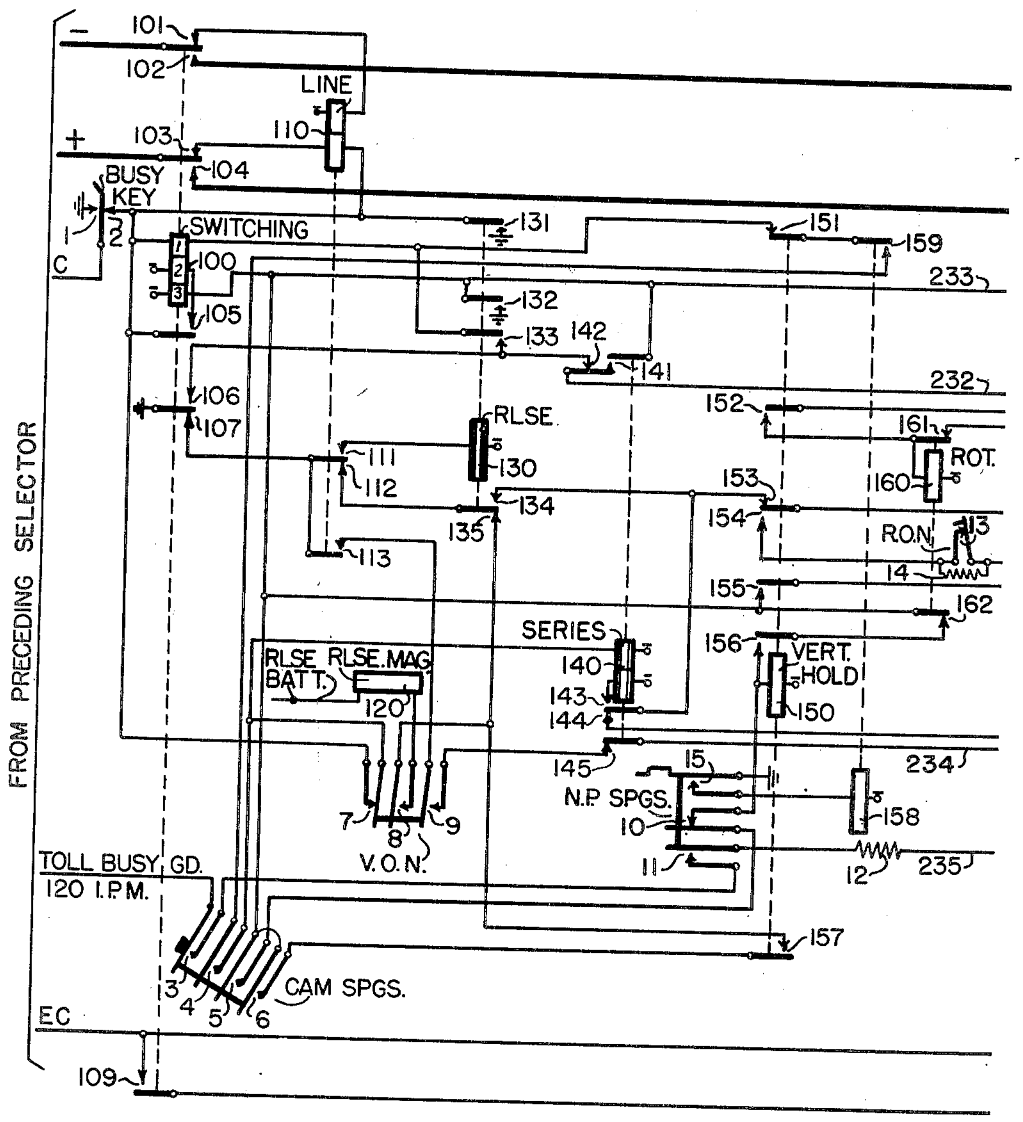

The foregoing as well as other objects of the invention will be pointed out in detail in the specification hereinafter, taken in conjunction with the accompanying drawings in which:

Fig. 1 depicts the arrangement of the line relay and pulsing circuit with associated release and series relays in the well-known Strowger vertical and rotary selector switch. Also are shown vertical off normal springs, cam springs, normal post springs and a rotary off normal spring. A vertical hold relay, a switching relay and the rotary stepping magnet are also shown in Fig. 1.

Figure 2:
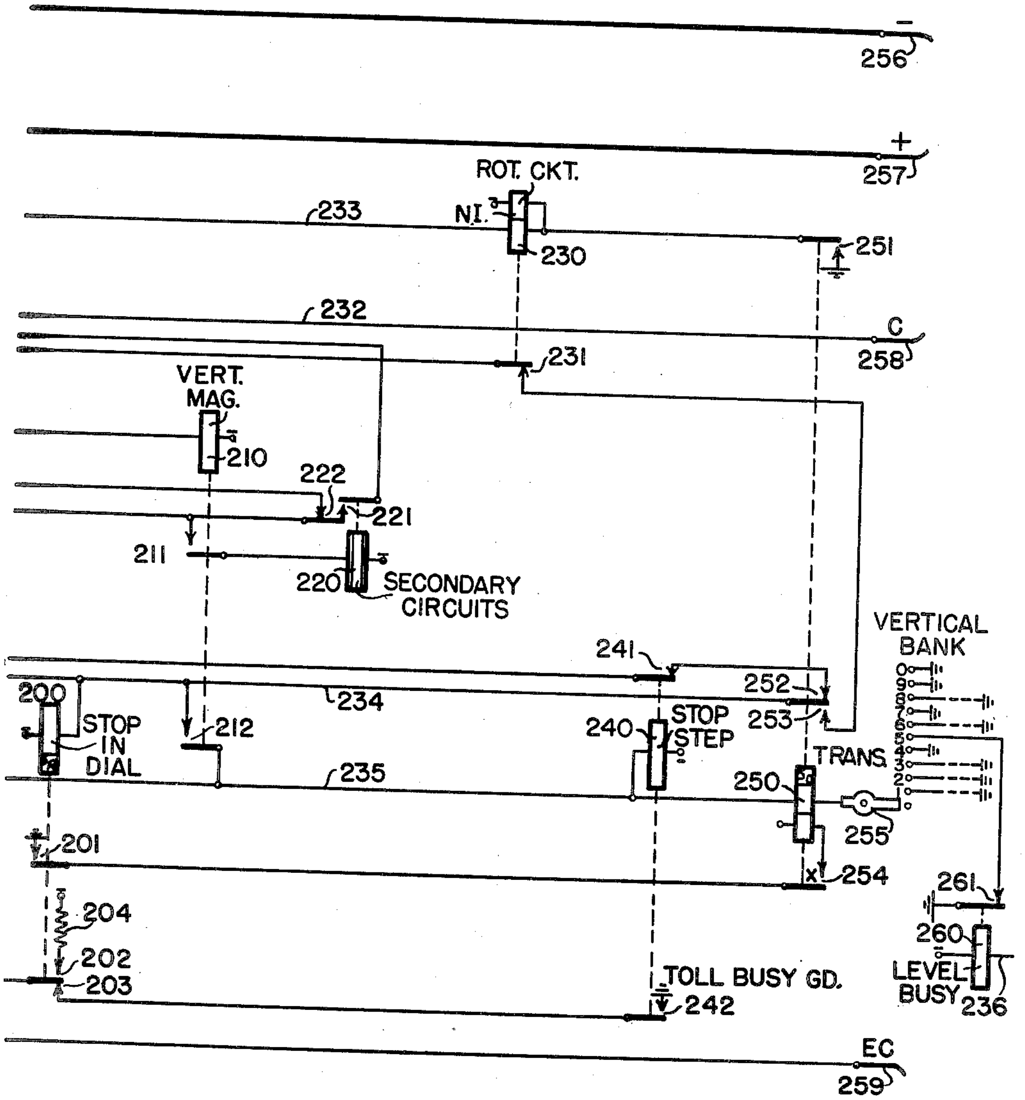

Fig. 2 is a continuation of Figure 1 which is placed to the right of Figure 1 and shows the vertical stepping magnet and a secondary rotary release relay and their circuit interrelation as well as a stop in dial relay, rotary circuit closing, stop step, and transfer relays. At the extreme right of Fig. 2 is shown symbolically the vertical bank, vertical bank wiper, permanent ground wiring of each top level of a group of trunks and the manner in which a level busy relay places ground on all other levels wherein an idle trunk is available, as well as removing ground therefrom when all trunks in the level are busy.

The present invention utilizes a switch having similar mechanical characteristics to that described in the Patent 1,767,719, issued to Victor S. Tharp on June 24, 1930, and is an improvement in the circuit and function therein.

This selector switch is one of a plurality of similar switches of the well known Strowger two motion type having access to a plurality of trunk lines and made available to subscribers by the dialing of a single digit.

The switch carries the usual line wipers and in this case, a vertical bank wiper and an extra control wiper. The switch carries, besides the normal bank contacts, a vertical bank of eleven contacts.

Onto the bank contacts are wired a plurality of trunk lines. These trunk lines may be arranged in groups or individually. For the purpose of explanation of the optimum function of this new switch, it will be assumed that the trunks are arranged in large groups, consuming more than one level of bank contacts per group. In such a case, for optimum performance, it is readily appreciated that the switch must hunt levels as well as within a given level for an idle trunk.

Responsive to dialling by the calling party the selector switch will be directively stepped to the first level of a group of trunks; this movement may be called the first group selecting movement. Each contact on the vertical bank is normally connected to ground thru an all trunk busy relay such as relay 260, except the last level of a group, which is permanently grounded. When an entire level of trunks or toll lines is busy, this relay 260 operates from ground over a chain circuit not shown which connects to lead 236 thru relay 260 to battery and thereby removes the ground from the vertical bank contact by opening contact 261. This in effect busies the level to the vertical wiper 255 and the vertical magnet will step the shaft until ground is found on another vertical bank indicating that an idle trunk is present within that level; this second movement may be called the second group selecting movement. The switch then goes into its trunk hunting movement and searches within the selected level for the idle trunk; when the idle trunk is found, the switch switches the connection thru to subsequent equipment, such as a connector. However, what may easily happen as the searching progresses is that the idle trunk may become busy due to another call thereto being reached by a companion selector before it is reached by the searching wiper of the instant selector. In such a case, ground will appear thereon and the wiper will continue to step across the bank to the next idle trunk, and if no more idle trunks exist within the level, it will step to the 11th contact from ground on the busy tenth contact. Stepping to the 11th contact operates cam springs allowing the switch to release its rotary motion to normal at which time the switch will automatically step up to the next level and search therein; this third vertical movement may be called the third group selecting movement. This sequence may be repeated until an idle trunk is found.

If all trunks in a group have been searched and are all busy the switch returns a busy signal to the calling subscriber or preceding toll operator this condition however, is not usual and with this invention, the possibility of a subscriber having to reoperate his calling device a second time to obtain a trunk connection is slight.

Having briefly described my invention, a detailed description thereof follows immediately hereinafter.

The switch is seized upon the completion of a loop to the line relay 110 by a calling toll operator in conventional manner. The loop completed may be thru a number of preceding switches such as a first and second selector or may be completed directly into this switch depending upon its position and function in the switch train. If used as a first selector then such a loop would be completed directly to this switch. For purposes of explanation let it be assumed that the instant switch functions as a first selector in a switch train and is preceded only by conventional operator's trunk line and sender. The calling operator's loop is directly completed into line relay 110 and is traced from ground placed on lead C thru contact 2, lower winding of relay 110, contact 103, over the plus (+) line and operator's calling loop, over minus (−) line in the instant switch, contact 101, upper winding of relay 110 to battery. This same ground on lead C operates series relay 140 thru contact 2, vertical off normal (V. O. N.) contact 7, upper winding of relay 140 to battery. In operating, series relay 140 closes contact 141 connecting the C wiper in Figure 2 over conductor 232, thru contact 141, and lower polarizing winding of switching relay 100 to battery; closes contact 143 preparing a locking circuit for itself in multiple with the vertical magnet 210 from ground on spring of relay 100 thru contacts 107, 112, 134, and branching thru contact 143 and lower winding of series relay 140 to battery as well as the other branch thru contact 153 and vertical magnet 210 winding to battery; and opens contact 145 and thereby the circuit to stop in dial relay 200. The line relay 110 operates over the loop circuit hereinbefore described and closes contact 111 energizing release relay 130 from ground on spring of relay 100 thru contacts 107, 111, winding of relay 130 to battery. Contact 113 is also closed preparing a 1st automatic secondary motion pulsing path traced from ground on spring of relay 100 thru contacts 107, 113, V. O. N. 9, 145, over conductor 234, contacts 253, 231 and 161 thru winding of rotary magnet to battery. Release relay 130 operates and closes contact 131 putting ground therethru out over the C lead thru busy key contact 2 to mark the switch as in use to preceding equipment; closes contact 133 preparing a circuit from the C wiper over conductor 232, contacts 142 and 133 thru upper operating winding of switching relay 100 and contact 131 to ground; closes contact 132 placing ground therethru to the lower winding of switching relay 100, to battery, the polarized winding alone being insufficient to operate relay 100; energizes rotary circuit relay 230 from ground thru contact 132, over conductor 233, lower and upper windings of relay 230 to battery; and closes contact 134 preparing the pulsing circuit for the vertical magnet from ground thru contacts 107, 112, 134, 153 and winding of vertical magnet 210 to battery.

The calling operator now operates her sender in the usual manner and the first set of impulses opens the loop circuit a number of times equal to the digit transmitted. This in turn causes line relay 110 to fall back a like number of times, each time closing contact 112 thereby completing the vertical pulsing circuit previously prepared and stepping the vertical magnet to the first level of the desired trunk group. The release relay 130 remains operated throughout pulsing due to its slow to release sleeved characteristic. As soon as the first vertical step is taken, the initial energizing circuit to the upper winding of series relay 140 is opened at now open V. O. N. contact 7, however, relay 140 remains operated during the entire series of pulses thru its locking circuit and lower winding also due to its sleeved effect. A moment after the last pulse, series relay 140 restores, again closing contact 142 connecting the C wiper as before to the upper operating winding of switching relay 100; closes contact 145 which operates the stop in dial relay 200 from ground on spring of relay 100 thru contacts 107, 113, V. O. N. 9, 145, winding of relay 200 to battery, causing the operator's impulse sender, not shown, to cease impulsing in the well known manner while the instant selector is hunting. This relay is used when the connection sought originates thru a toll operator who sets up the call upon the keys of an impulse sender in well known manner. Also, in reclosing contact 145, the circuit prepared to the rotary magnet traced hereinbefore, is further completed therethru.

Stop in dial relay 200 in operating over the circuit described closes contact 202 placing battery thru 1500 ohm resistor 204 onto the extra control, EC, lead which causes a relay in an associated sender control circuit, not shown, to operate. The operation of this relay prevents the sending of impulses so long as battery is placed on the EC lead. Relay 200 remains operated during hunting and until the switch has switched thru. Contact 201 also closes preparing a circuit for holding transfer relay 250.

At this point, it is well to remember as described briefly in the general description hereinbefore that each vertical bank contact is normally connected to ground thru an all trunk busy relay except the vertical bank contact of each top level of a group, which contact is permanently grounded. When an entire level of trunks is busy, level busy relay 260 operates over a chain circuit connected to lead 236 and removes ground from the associated vertical bank contact.

After the first set of impulses has been received, the shaft has raised the wipers to the first level of the desired trunk group, and vertical wiper 255 rests on the level's associated vertical bank contact.

Assuming for the moment that all trunks within this level are busy, there will be an absence of ground on the associated vertical bank contact. The vertical magnet reoperates automatically over a circuit from ground on spring of relay 100, thru contacts 107, 113, V. O. N. 9, 145, 252, 241, 144, 153, winding of vertical magnet 210 to battery, and raises the shaft to the next level. This sequence is repeated until ground is found on a level indicating an idle line therewithin or that the uppermost level of the selected group has been reached. Each time the vertical magnet operates contact 212 is closed, operating stop step relay 240 from ground on conductor 234 thru contact 212, conductor 235, and winding of relay 240 to battery. Contact 211 is also closed but is of no consequence at this time because contacts 154 and 155 are as yet open. Relay 240 in operating opens the vertical magnet automatic stepping circuit previously described, at contact 241. This sequence occurs after each automatic vertical step during level hunting. Closing contact 242 is of no consequence at this stage.

Assuming now that ground is found on a level indicating an idle line therewithin, transfer relay 250 operates in series with stop step relay 240 from ground found on the vertical bank contact thru upper winding of relay 250, winding of relay 240 to battery. Transfer relay 250 operates and closes its "X" contact 254 locking therethru to ground at previously closed contact 201, and when fully operated closes contact 253 transferring the pulsing circuit previously traced therethru to the rotary magnet; and closes contact 251 short circuiting rotary circuit relay 230. Relay 230 is slow to release due to it being short-circuited and, a certain amount of time elapses before it releases, closing contact 231 thereby completing the 1st pulsing circuit to the rotary magnet and permitting it thereby to operate.

The rotary magnet now operates self interrupted over the circuit traced hereinbefore and causes the shaft to rotate until battery, indicating an idle trunk is found on the C wiper. Each time rotary magnet 160 operates, it opens its own circuit at contact 161. Each time rotary magnet 160 falls back contact 161 closes and the magnet reoperates. This sequence continues until an idle trunk with battery is found or until the 11th bank contact is reached. When an idle trunk is found battery on the C wiper completes the circuit to the upper operating winding of switching relay 100. On the first rotary step, the vertical wiper 255 leaves the vertical bank and opens the circuit previously traced to relays 240 and 250 in series. Transfer relay 250, however remains operated over its locking circuit thru its lower winding. At this point it might be well to point out that the switch is held in operated position after each step, vertical or rotary, by the well known double dog not shown.

Switching relay 100 operates and closes contacts 102 and 104 switching the — and + lines thru respectively to wipers 256 and 257 and switches therethru the loop circuit from the operator's position to the next succeeding switch so that additional impulses may be sent by the toll operator's impulse sender. At the same time contacts 101 and 103 are opened releasing line relay 110. Contact 107 is opened removing ground therethru to the release magnet 120, rotary magnet 160 and release relay 130 and stop in dial relay 200, the rotary magnet can step no further. In closing contact 106, ground is placed on the C wiper thru contact 106, 142, conductor 232 to wiper C to hold the succeeding switch. Contact 105 is also closed completing a holding circuit thru its holding middle winding traced from ground on the C lead thru contact 105, middle winding of relay 100 to battery. Closing of contact 109 extends the EC lead therethru to the next switch for supervision therein.

Release relay 130 restores but the circuit to the release magnet is controlled at open contact 107.

Final release occurs when the operator disconnects removing ground from the C lead causing relay 100 to restore. Relay 100 restoring closes contact 107 and a circuit is completed to release magnet 120 from ground thru contacts 107, 112, V. O. N. 8, winding of release magnet to battery. Relay 100 at contacts 106 removes the ground holding the succeeding switches to cause their release. When the switch returns to normal release magnet 120 restores when its circuit is opened mechanically at V. O. N. contact 8.

Assuming now that the switch has sought out a level which has only one idle trunk and as the wipers step into that level as explained hereinbefore, and assuming further that another selector has reached and seized the idle trunk before the instant selector has been able to hunt it down, in such a case, the contact previously idle, no longer is marked with battery so that it will not stop the self interrupted stepping of the rotary magnet of the instant switch, which as explained before is only stopped by the encountering of battery. Consequently the wipers thereof reach the 11th bank contact and mechanically operate cam springs closing contacts 3, 4, 5 and 6 thereon. As the cam springs close, a circuit is completed to the vertical hold relay 150 which is traced from ground thru contacts 132, cam springs contact 5, normal post spring contact 10, thru winding of relay 150 to battery. The normal post (N. P.) springs are mechanically arranged to open only when the vertical wiper reaches an uppermost lever of any trunk group. As it has not yet been assumed that the switch has stepped up to the last level in the group in which connection is sought, the normal post springs are closed.

Vertical hold relay 150 operates on each level except a last level in a group.

To insure that vertical hold relay 150 operates and that the switching relay 100 does not operate thru its upper operating winding rendering a false operation of the switch before the last level in the group is reached, the operating circuit to the operating winding of relay 100 is open at contact 159 on relay 158. When a last level is reached, normal post springs mechanically operate, which will be more fully described hereinafter.

Relay 150 in so operating closes contact 156 establishing a locking circuit for itself traced from ground thru contacts 132, 162, 156 and winding of relay 150 to battery; closes also contact 157 establishing an operating circuit for release magnet 120 traced from ground thru contact 132, cam spring contact 6, contact 157, V. O. N. 8, winding of release magnet 120 to battery thereon; closes contacts 154 and 155 establishing a 2nd circuit to the vertical magnet in series with an 150 ohm resistance which circuit is traced from ground thru contacts 132, 155, 222, 150 ohm resistor 14, contact 154 to the vertical magnet and battery. This resistance allows the vertical magnets in series therewith to only partially energize sufficient to hold the shaft in its vertical position but not enough to operate fully and step the wiper vertically; opens contact 151 to insure that switching relay 100 does not operate at this time, and closes contact 152 preparing a 2nd circuit to the rotary magnet for subsequent reoperation. Release magnet 120 operates releasing the double dog permitting return of the shaft to rotary normal which allows cam springs to restore opening the release magnet circuit at contact 6. Complete restoration to rotary normal is mechanically insured by a release link engaging a double dog as conventionally accomplished in Strowger switches of the type described. When the shaft returns to rotary normal it closes the rotary off normal (R. O. N.) spring contact 13 which short circuits the 150 ohm resistor 14 in the vertical magnet circuit previously described allowing vertical magnet 210 to fully operate and step the wipers up one step. In operating, the vertical magnet 210 closes contact 211 operating secondary circuits relay 220 from ground thru contacts 132, 155, 211 to relay 220 and battery. Relay 220 operates opening contact 222 and thereby opens the automatic stepping circuit to vertical magnets 210 and closes contact 221 completing a 2nd circuit to the rotary magnets 160 from ground thru contacts 132, 155, 221, 152 to rotary magnet and battery. Vertical magnets 210 restores and rotary magnet 160 operate. Restoration of vertical magnet 210 opens the circuit to secondary circuit relay 220 at contact 211 but due to its sleeved slow to release characteristic, it holds operated long enough to insure complete operation of the rotary magnet. Operation of the rotary magnet opens the holding circuit to vertical hold relay 150 at contact 162 which restores and in so doing, relay 150 in turn opens the 2nd circuit to rotary magnet 160 at contact 155 which restores the rotary magnets. The switch wipers are now on the first bank contact of the next higher level. The rotary magnet now operates over its first operating circuit, self interrupted at its contact 161 stepping the wipers one contact at a time until an idle trunk marked by battery is found by the C wiper 258. This battery as described before operates switching relay 100 opening the rotary magnet circuit at contact 107 and switching the connection thru at contact 102 and 104. Should no idle trunk be encountered on the next higher level searching just described, the rotary magnet steps the shaft to the eleventh contact operating cam springs as before and the sequence just described is repeated. Such sequence of operation is stopped only when the uppermost level in the group selected is reached which operates the normal post springs prohibiting further vertical stepping, which condition will now be described.

Assuming that the switch has stepped up to a level which tests as having an idle trunk therein, and that another companion selector has reached the idle trunk first while the instant switch is stepping within such level and assuming further that all remaining trunks in the group are busy, the same sequence of operation will continue as described immediately hereinbefore except that under the present assumption of all trunks busy, the switch continues stepping up to the next level, hunting thru such level rotary wise, operating cam springs on each 11th contact so reached, stepping up one level again, searching the level rotary wise, and continuing this sequence until the uppermost level in the trunk group is reached. At this point, normal post springs mechanically operate. The normal post springs are arranged to open mechanically when the shaft reaches the uppermost level in any trunk group and of course, the top level in the bank which must of necessity also be the uppermost level of a trunk group. The rotary magnet operates on its second pulsing circuit as described before and steps the wipers onto the first contact of the group top level. Also as before, rotary stepping continues over the original pulsing circuit until the eleventh bank contact is reached. Cam springs operate on the 11th step but the release magnet does not operate. As normal post springs are operated, the initial operating circuit to vertical hold relay 150 is open at normal post contact 10. Without benefit of relay 150 operated, the 2nd vertical magnet circuit is open at contacts 154 and 155 so that it cannot reoperate, and without relay 150 operated, contact 157 remains open so that the release magnet circuit previously traced therethru is also open.

Normal post contact 15 is also closed when the last level in the group reached operating relay 158. Relay 158 then functions to close contact 159 so that if an idle contact is found, the operating circuit of the switching relay 100 is prepared. This circuit is described immediately hereinafter in conjunction with the failure of vertical hold relay 150 to operate on the last level in a group.

The failure of vertical hold relay 150 to operate when the last level in a group is reached now allows contact 151 to be closed which completes a circuit from ground on the C lead, thru busy key contact 2, upper winding of switching relay 100, contact 151, contact 159, cam spring contact 4, upper winding of series relay 140 to battery. Both relay 140 and relay 100 operate and in operating, relay 140 opens contact 145 breaking the circuit to stop in dial relay 200. Relay 200 releasing closes contact 203 to prepare the busy circuit out over the EC lead.

Returning to the point where the switch reached the eleventh contact on the top level of the group sought, a circuit is completed to stop step relay 240 which now functions as a busy relay. This circuit is traced from 120 interruption per minute toll busy ground thru cam spring contact 3, normal post contact 11, resistance 12, over conductor 235, winding of relay 240 to battery. Relay 240 flutters 120 times a minute placing toll busy ground an equal number of times a minute onto the EC lead which signals the calling party or a preceding toll operator that the trunk group is busy. This signalling circuit is traced from toll busy ground thru contacts 242 and 203 out over the EC lead to a lamp and battery not shown.

Having described my invention in detail, what I desire to be protected by issuance of Letters Patent of the United States is as follows.

What is claimed is:

1. In a telephone system including a plurality of companion selectors, an automatic selecting switch having group selecting and trunk hunting stepping movements, a plurality of terminals arranged in levels thereon, a trunk line connected to each terminal, means for busy marking each individual trunk line, a group of said trunk lines comprising a plurality of levels, means for marking each level when all trunks are busy thereon, means for operating said switch in a first directive group selecting movement to a desired level in said trunk group, means responsive to an all busy marking condition on said desired level for operating said switch in an automatic second group selecting movement to find the next level containing an idle trunk, circuit means effective responsive to the termination of said second group selecting movement for operating said switch automatically in a trunk hunting movement within said next level and means effective responsive to the busying by one of said companion selectors of a sole idle trunk on said next level before said switch steps thereto for operating said switch in a third group selecting movement to the immediate succeeding level, said circuit means also effective responsive to the termination of said third group selecting movement for again operating said switch automatically in its trunk hunting movement in said immediate succeeding level, and in case said latter level is busy, the cycle of said third group selecting and said trunk hunting movements being successively repeated by their said respective means until an idle trunk is reached.

2. In a telephone system including a plurality of companion selectors, an automatic selecting switch, a plurality of terminals arranged in levels accessible to said switch, means for marking each level when all trunks are busy thereon, a trunk line connected to each of said terminals, a group of trunk lines comprising a plurality of levels, means for directively operating said switch to a desired level, means responsive to said switch encountering a busy marking condition on said desired level for causing said switch to level hunt without searching in said desired level until the first succeeding level containing an idle trunk is reached, a third means effective upon termination of said level hunting for trunk searching within said first succeeding level to find an idle trunk, and means effective subsequent to the operation of said third means in case of a prior seizure of the last idle trunk in said first succeeding level by one of said companion selectors before said switch steps thereto for advancing said switch one level, said third means also effective upon termination of said one level advancement of said switch for searching said latter one level, further advancement of said switch one additional level by said last means and trunk searching in said additional level by said third means being repeated until an idle trunk is found.

3. In a telephone system as claimed in claim 2 wherein means in said switch is operative after reaching and searching the last level in the group and finding all of the trunks in said group busy for signaling said busy condition.

4. In a telephone system including a plurality of companion selectors, an automatic selecting switch, a plurality of levels accessible to said switch, means for marking each level when all trunks are busy thereon, each level containing a plurality of trunk lines therein, means for directively operating said switch to a desired level, a second means for operating said switch to search for an idle trunk within said desired level, means in said switch effective in case said marking means indicates all of the trunks in said desired level are busy for causing said switch to level hunt until the first succeeding level containing an idle trunk is found, and means cooperating with said second means effective in case the last idle trunk in said succeeding level is busied by one of said companion selectors while said switch is searching for said last idle trunk for advancing said switch to the next level and for operating said switch to search for an idle trunk in said next level, further advancement of said switch one additional level and trunk searching in said additional level by said last means being repeated until an idle trunk is found.

5. In a telephone system including a plurality of companion selectors, an automatic selecting switch having a vertical and a rotary selecting movement, a plurality of terminals on said switch arranged in levels, means for marking each level when all trunks are busy thereon, a trunk line connected to each of said terminals, groups of trunk lines each occupying a plurality of said levels, means for directively operating said switch in its vertical movement to select any desired level of terminals in a trunk group, testing means effective upon completion of said vertical directive movement for testing said marking means of the selected level to determine whether a terminal therein is connected to an idle trunk line, means responsive to a test of said marking means by said testing means indicating an idle trunk in said selected level for causing said switch to operate automatically in its rotary movement and to test said terminals in said selected level individually, rotary releasing means effective if the last idle trunk in said selected level is seized by one of said companion selectors before said switch steps thereto during said rotary movement for releasing said switch to its rotary normal position, means effective subsequent to operation of said rotary releasing means for reoperating said switch in its vertical movement to the immediate succeeding level, said rotary releasing means also operable responsive to the finding of an all trunk busy condition in said immediate succeeding level thereby causing said subsequent means, operative after said rotary releasing means, to operate said switch to the next level and to search in said next level for an idle trunk until the last level of said desired trunk group is reached and searched over, and means effective responsive to said switch finding all the trunks in said last level of said trunk group busy for signalling an all trunk busy condition.

6. In a telephone system as claimed in claim 5 including means effective in case said testing means for testing the marking means of said selected level indicates an all trunk busy condition in said selected level for automatically advancing said switch in another vertical movement.

7. In a telephone system including a plurality of companion selectors, an automatic selecting switch having a vertical selecting movement and a rotary selecting movement, a plurality of terminals arranged in levels on said switch means for marking each level when all trunks are busy thereon, a trunk line connected to each terminal, a group of trunk lines occupying a plurality of said levels, means for directively operating said switch in its vertical movement to select a desired level of terminals in said group, testing means effective upon completion of said directive vertical movement for testing said marking means of the selected level to determine whether it contains an idle trunk line, means effective in case said marking means indicates all the trunks in the selected level are busy for causing said switch to operate automatically in its vertical movement and repeat said test by said testing means for each successive level, a fourth means in said switch effective in case said marking means of the next succeeding level indicates an idle trunk in said next succeeding level for causing said switch to operate automatically in said rotary movement searching said trunk lines therein successively, a fifth means effective if the last idle trunk in said latter level is seized by one of said companion selectors before the said switch reaches said last idle trunk in said automatic rotary motion for reoperating said switch in its vertical motion and automatically advancing it to the immediate succeeding level, said fourth means effective upon said switch reaching said immediate succeeding level for causing said switch to operate automatically in said rotary movement searching over each terminal successively in said immedate succeeding level for an idle trunk, said fifth means again effective, in case one of said companion selectors has seized the last idle trunk in said immediate succeeding level before said switch reaches said last trunk in its automatic rotary movement, to repeat the cycle of vertical movement to the next level and rotary movement in said next level until an idle trunk in said selected group of trunks is found.

8. In a telephone system as claimed in claim 7 including rotary releasing means in said switch effective, after said rotary movement in said latter level and before reoperating said switch in its vertical movement to said immediate succeeding level, for partially releasing said switch to its rotary normal position without releasing said switch from its vertical operated position in case said switch in its rotary movement in said latter level encountered an all trunk busy condition; and said fifth means including means responsive to said partial release of said switch to its rotary normal position for operating said switch in said vertical movement to the next succeeding level of said trunk group.

9. In a telephone system as claimed in claim 7, wherein after the last idle trunk in a selected level has been seized by one of said companion selectors and said switch has automatically advanced vertically to said next succeeding level, circuit means including said fourth means is effective for moving said switch in said rotary movement to the first of said terminals on said latter level, and additional circuit means of said fourth means alone responsive to a busy condition of said first terminal and succeeding busy terminals of said latter level for causing said switch to continue said rotary movement across said terminals searching for an idle trunk in said latter level.

10. In a telephone system, an automatic selecting switch having group selecting and trunk hunting stepping movements, means for directively stepping said switch in a first group selecting movement, means for automatically stepping said switch a plurality of steps in a second group selecting movement, means for terminating said automatic stepping in said second group selecting movement, trunk hunting means effective after termination of said second group selecting movement for causing said switch to step automatically a plurality of times in a first trunk hunting movement, means for thereafter stepping said switch automatically in a third group selecting movement, additional means responsive to said third group selecting movement for causing said switch to automatically step only one step in a second trunk hunting movement; and said trunk hunting means again effective responsive to a busy condition upon termination of the said one step in said second trunk hunting movement for causing said switch to step a plurality of times to continue said second trunk hunting movement.

FRANK KESSLER.

References Cited in the file of this patent

UNITED STATES PATENTS

| Number | Name | Date |
|---|---|---|
| 1,809,882 | Wright | June 16, 1931 |
| 1,886,613 | Wicks | Nov. 8, 1932 |
| 2,210,876 | Beale | Aug. 13, 1940 |